Feb. 6, 1951

C. M. WOODRUFF 2,540,772

FRUIT JUICE EXTRACTOR WITH RECIPROCATING
AND ROTATING FRUIT HOLDERS

Filed March 25, 1947

CHESTER M. WOODRUFF,
INVENTOR.

BY W. F. Beatty

ATTORNEY.

CHESTER M. WOODRUFF,
INVENTOR.

BY
ATTORNEY.

CHESTER M. WOODRUFF,
INVENTOR.

BY

ATTORNEY.

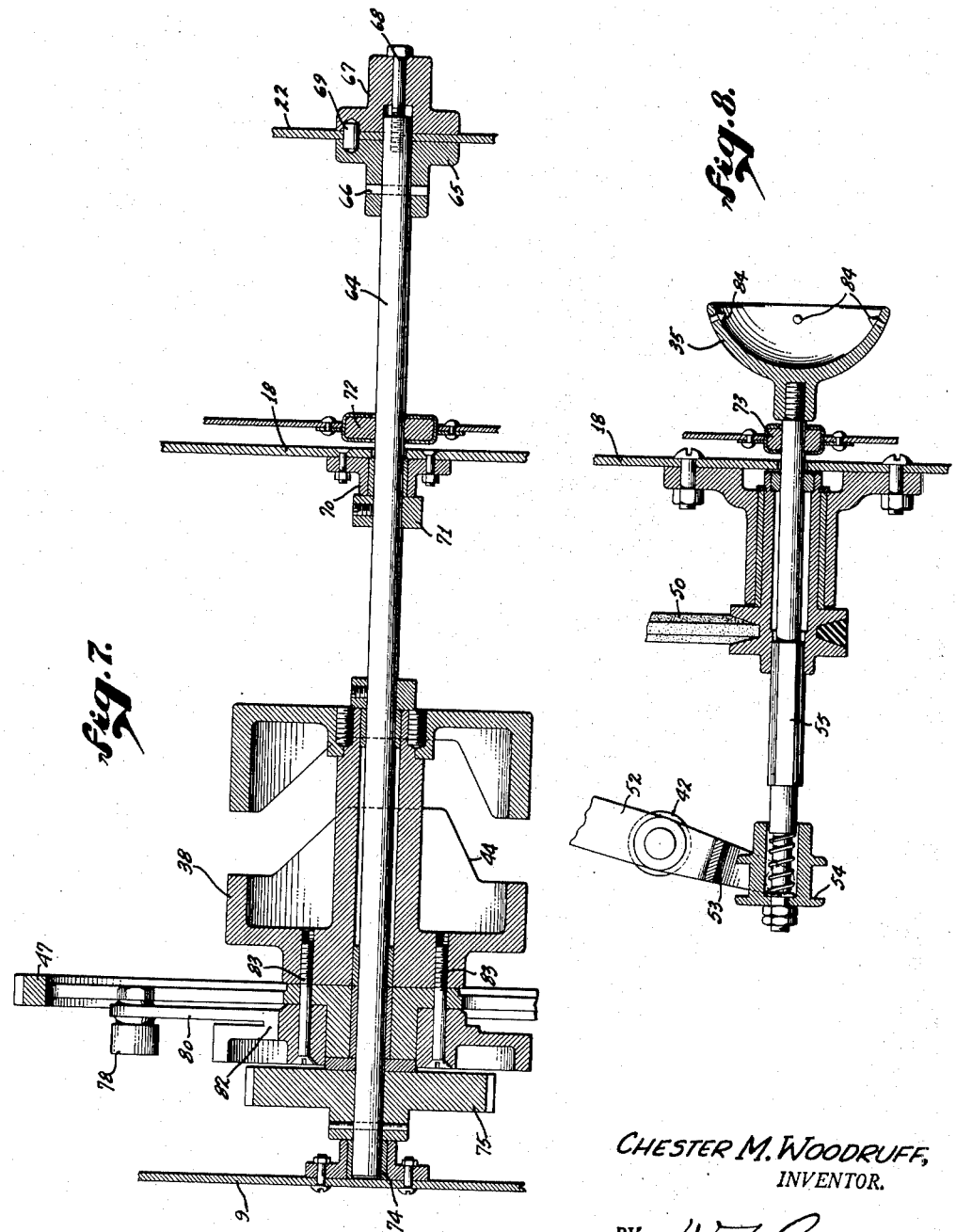

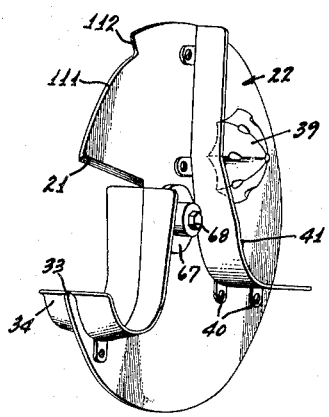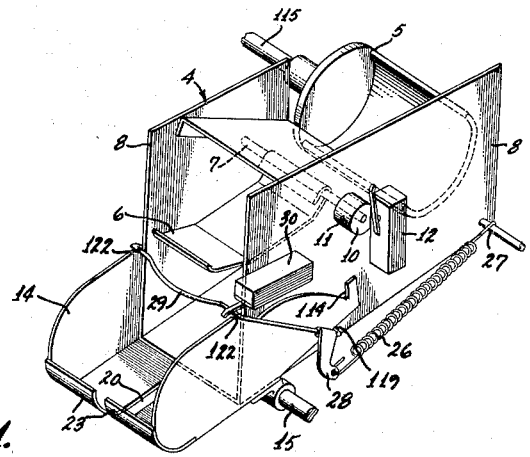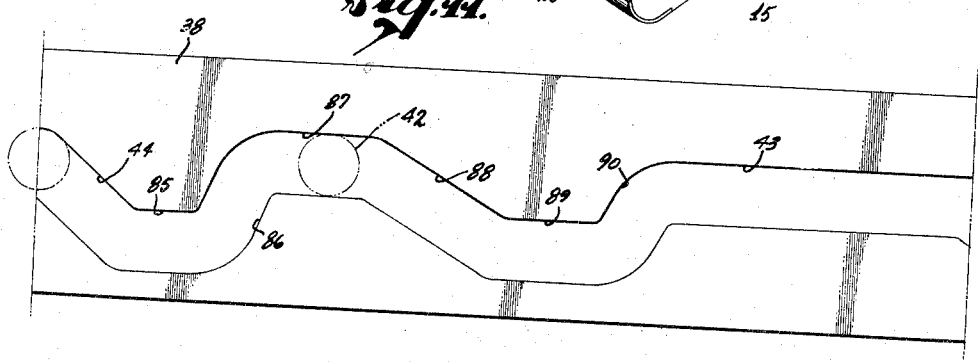

Patented Feb. 6, 1951

2,540,772

UNITED STATES PATENT OFFICE 2,540,772

FRUIT JUICE EXTRACTOR WITH RECIPROCATING AND ROTATING FRUIT HOLDERS

Chester M. Woodruff, Los Angeles, Calif., assignor to Woodruff Associates, Los Angeles, Calif., a partnership Application March 25, 1947, Serial No. 736,993

10 Claims. (Cl. 146—3.)

The invention relates to a machine for cutting fruit such as oranges, in half with means for extracting the juice from both halves and means for ejecting the rinds.

While it has been proposed heretofore to provide an automatic machine for the above purposes, the present machine has the novel feature of cutting the fruit in half, extracting the juice from both halves, and ejecting the rinds, all at the same locus in the machine. This is made possible, by arranging a carrier preferably in the form of a disk or wheel, with a bucket, a cutting blade, a squeeze head, and an ejecting abutment all arranged on the carrier, in combination with fruit holders which reciprocate and rotate on a fixed axis. The holders take the fruit from the bucket and rotate the fruit in the path of the cutting blade, the holders also being reciprocated in timed relation with the movement of the carrier, to effect the squeezing and ejecting operations. In other words, the bucket and various tools on the carrier are sequentially brought into operative relation with the fruit holders.

An object of the invention is to cut the fruit in half and squeeze both halves at the same locus, and preferably also to eject the rinds at that locus.

Another object is to provide a fully automatic machine having a hopper or magazine to hold a quantity of oranges, with provisions for automatically stopping the machine if either the juice container is loaded with juice or if the magazine is empty, while insuring that the machine will only stop when the carrier is in such a position that it has cut, squeezed, and ejected a particular fruit and is therefore empty of cut fruit and in a position to operate on the next fruit when the magazine is again loaded and the machine started into operation.

Another object is to provide an improved means for cutting the fruit in half. This is accomplished by rotating the fruit holders on a fixed axis while advancing the cutting blade against a fruit in the holders.

Another object is to provide an improved means for squeezing the fruit halves. This is accomplished by separating the fruit holders with a half fruit in each holder to admit a squeeze-head therebetween and by rotating the fruit holders while advancing the fruit against the squeeze-head.

Another object is to provide an improved means for ejecting the rinds. This is accomplished by rotating the fruit holders with their rinds, while advancing an abutment against the rinds.

A further feature of the invention relates to an improved means for transferring the fruit one at a time from the magazine to the carrier.

The invention further resides in various features, taken singly or in combination as described hereafter and more particularly set forth in the claims.

For further details of the invention, reference may be made to the drawings wherein—

Fig. 1 is a front view in elevation of a fruit juice extractor according to the present invention with the hopper broken away.

Figs. 2 to 5 inclusive are sectional views on lines of the corresponding numbers in Fig. 1, looking in the direction of the arrows.

Figs. 6 and 7 are sectional views on lines of the corresponding numbers in Fig. 3, looking in the direction of the arrows.

Fig. 8 is a sectional view on line 8—8 of Fig. 2, looking in the direction of the arrows.

Figs. 4 to 8 are enlarged views.

Fig. 9 is a perspective view of the carrier.

Fig. 10 is a perspective view of the chute and dipper for transferring the fruit one at a time from the magazine to the carrier.

Fig. 11 is an enlarged developed view of a cam for reciprocating the fruit holders.

Fig. 12 is a schematic circuit diagram for starting and stopping the motor.

Figure 1:
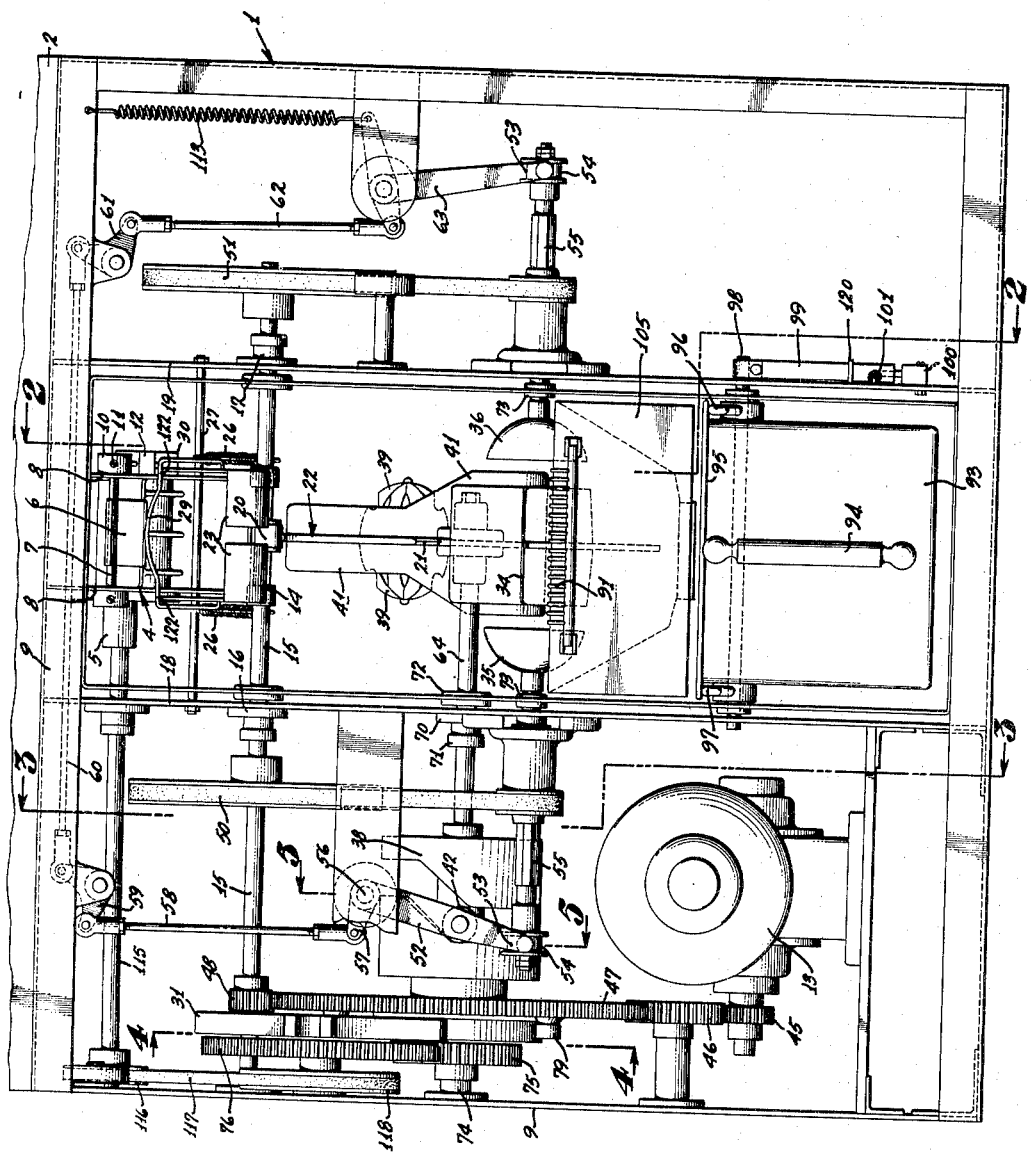
Figure 2:
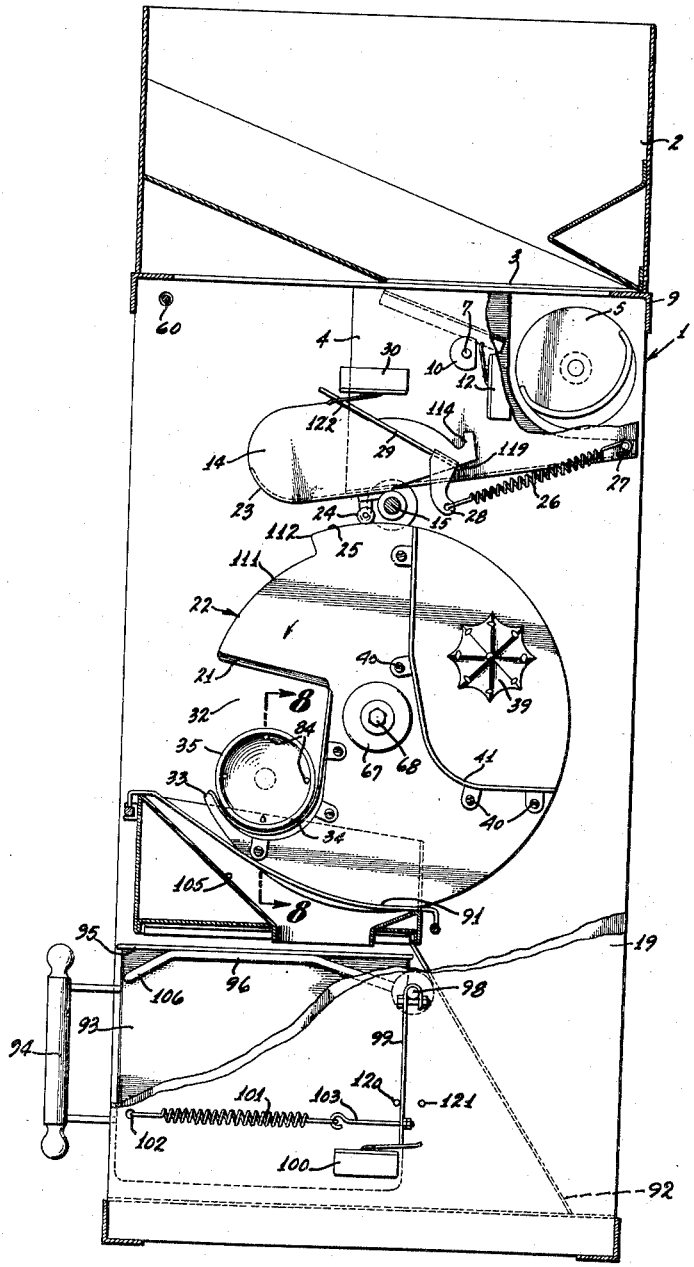
Figure 5:
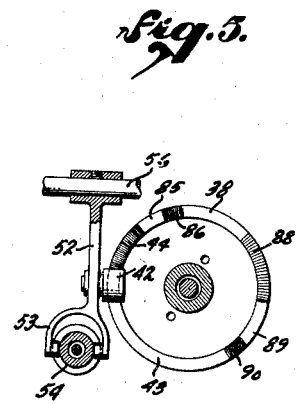
Figure 6:
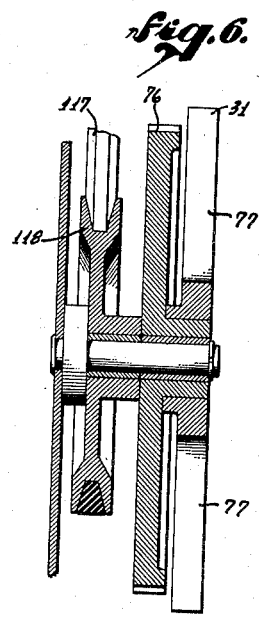
Figure 3:
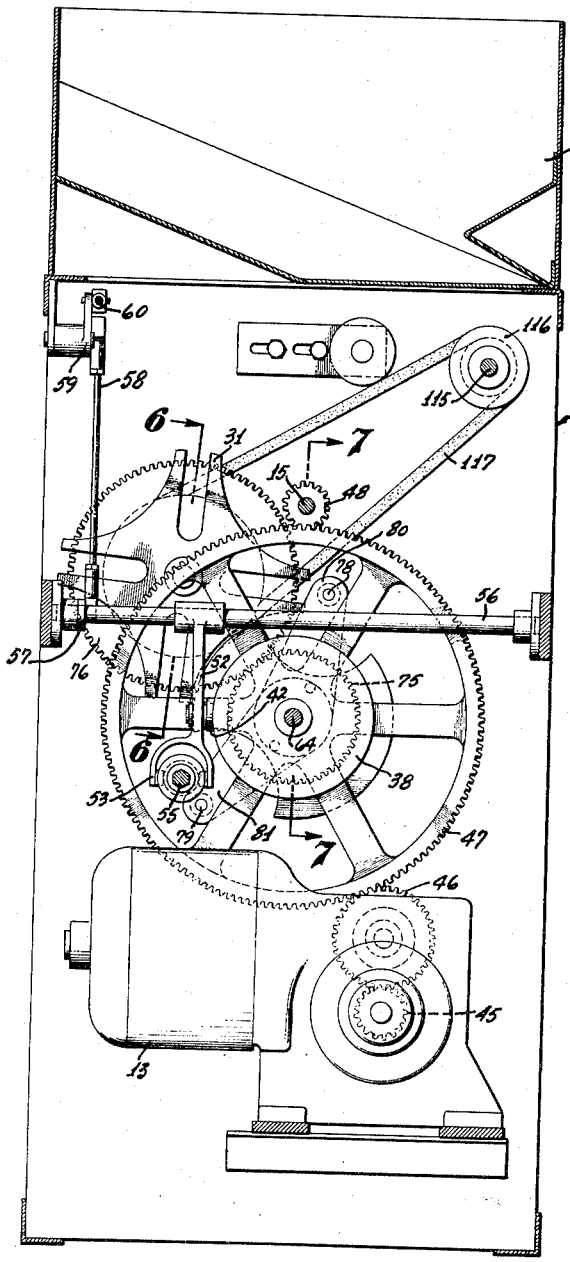

Referring in detail to the drawings, the fruit juice extractor 1, as shown in Figs. 2 and 3, at the top thereof has a hopper 2 for receiving a quantity of oranges or the like which drop by gravity through the opening 3 into a chute 4, see Figs. 2 and 10. A suitable rotary valve 5 is operated as later described to feed fruit one at a time from the hopper to the chute 4. Valve 5 makes one revolution for each revolution of wheel 22 and is driven by shaft 115, see Fig. 1 having pulley 116 and belt 117. Belt 117 is driven by pulley 118, see Fig. 6. Pulley 118, gear 76 and Maltese cross 31 are suitably fixed together and rotate in unison. The fruit drops one at a time into the chute 4 and passes underneath an upper arm 6 which is fixed at its rear end to an axle 7 pivotally supported in risers 8 on the main frame 9. Fixed to one end of the axle 7 is an eccentric block 10, adjusted in position by set screw 11, and which operates a switch 12. Switch 12, as shown in Fig. 12, and as further described later, is in the circuit of a motor 13 which drives the machine. Switch 12 is maintained closed as long as there is fruit in the chute 4. When chute 4 is empty, the arm 6 drops by gravity to open switch 12.

At the outer end of chute 4 and forming an extension of it, is a dipper 14 which has an axle 15 carried by bearings 16, 17, see Fig. 1, in the frame members 18, 19. The outer end of dipper 14 is provided with a central longitudinal recess 20, see Fig. 10, to permit the blade 21 on the disc wheel 22 to pass through it. The bottom of the outer end of dipper 14 is curved upwardly as indicated at 23 in Figs. 2 and 10, to prevent the fruit from dropping out of the dipper when it is in the position shown in Fig. 2 wherein the dipper 14 is maintained in the inclined position shown by a roller 24 on the dipper riding on the wheel periphery 25. The roller 24 is held on the periphery of the wheel 22 by means of a tension spring 26 which is fastened at one end to the chute as indicated at 27 and fastened at its other end to an arm 28 on the bridle 29 which is pivoted in the side walls of chute 4 as indicated at 119.

From Fig. 2 it is apparent that the blade 21 is on the lagging portion of wheel 22 relatively to the bucket 34 which is on a leading portion of the wheel.

The wire bridle 29 serves as a guard and drops in front of the chute 4 when the dipper 14 drops, guard 29 holding back the remaining fruit in the chute, with one fruit at the front of the guard 29 in the dipper 14. The wheel 22 operates the dipper 14 which moves bridle 29 to operate a switch 30 in circuit with the motor 13 as shown in Fig. 12. Switch 30 is closed when bridle 29 is raised by dipper 14 to its upper position as shown in Figs. 2 and 11. Switch 30 is opened when the bridle 29 and dipper 14 tilt down. The tilt of dipper 14 is limited by the hook 114, see Fig. 10, striking the straight portion 122 at each side of the bridle 29.

Figure 4:
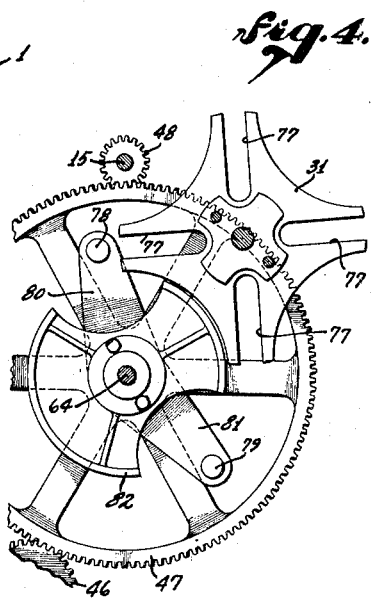

The carrier is here illustrated as the wheel 22, in the form of a disk having the cutting blade 21. The wheel is rotated in a counterclockwise direction by the motor 13, the rotation being step by step under control of the Maltese cross drive 31, shown in Fig. 4. The wheel 22 has a cut-away portion 32 into which the dipper 14 is adapted to descend after the leading edge 33 of the cut-away portion 32 passes beyond the roller 24, to deposit the fruit in the dipper 14 into the open ended bucket 34, see Fig. 9, on the leading edge of the cut-away portion 32.

The companion fruit holders 35 and 36, see Fig. 1, rotate and reciprocate on a fixed axis 37 and they are advanced towards each other or spread apart under control of a cam 38 which is driven by motor 13 to operate the fruit holders 35, 36, in timed relation with the step by step rotation of wheel 22. Diametrically opposite the center of bucket 34, on the wheel 22, is a double squeeze-head or reamer 39. Also projecting on opposite sides of the wheel 22 and secured thereto by bolts like 40 or otherwise is an ejector flange 41.

The wheel 22 pauses each half revolution, one of its stationary positions being shown in Fig. 2 wherein the bucket 34 contains a fruit received from the dipper 14. The index roller 42, see Fig. 1, which reciprocates the fruit holders 35, 36 then being in a straight portion 43 of the cam groove, see Fig. 11, to maintain the fruit holders 35 and 36 apart to permit the fruit to be brought between them to the position shown in Fig. 2. The inclined portion 44 of the cam groove causes the holders 35, 36 to advance through the opposite ends of the bucket 34 to grasp the fruit and hold it whereupon the wheel 22 rotates to cut the fruit in half by the blade 21, the holders 35 and 36 being constantly rotated by the motor 13.

As shown in Fig. 3, motor 13 has a suitable reducing gear which terminates in a pinion 45 which meshes with an idler gear 46 to drive spur gear 47 which drives pinion 48. Pinion 48 is secured to and rotates a shaft 49 which drives belt 50 to rotate holder 35 and belt 51 to rotate holder 36. The index roller 42 is arranged on an intermediate portion of a lever arm 52 which carries at its outer end a fork 53, see Fig. 1, which operates in a collar 54 to reciprocate the holder 35. The holder 35 is on a spline shaft 55 rotated by belt 50. Lever 52 pivots about the center 56 and has lever extension 57 which operates through link 58, bell crank lever 59, link 60, bell crank 61, link 62, bell crank 63, to move the holders 35 and 36 toward or away from each other, or maintain them together or apart under control of the index roller 42.

Referring to Fig. 7, the wheel 22 is mounted on and connected to a shaft 64, by a sleeve 65 on one side of the wheel and connected to shaft 64 by a pin 66, with a sleeve 67 on the other side of the wheel. The wheel 22 is clamped between the sleeves 65 and 67 by a bolt 68, and the sleeves 65 and 67 are locked to the wheel by pins like 69. An outboard bearing 70 in the frame 18 of the machine is provided for an intermediate portion of the shaft 64. Lengthwise movement of shaft 64 to the right is prevented by a stop collar 71. Leakage of fruit juice into bearing 70 is prevented by a felt seal 72. A similar seal, as indicated at 73 in Fig. 8, is provided for each of the fruit holders 35, 36. The left end of shaft 64 is provided with a bearing 74 supported by the frame 9. Fixed to the shaft 64 is a spur gear 75 which is driven by gear 76 as shown in Fig. 3. Gear 76 carries the driver member of a Geneva movement such as the Maltese cross 31 which has four radial slots like 77 in Fig. 4, arranged 90 degrees apart. The cross 31 is operated by the pins 78 and 79 arranged on arms 80 and 81 respectively, the latter projecting from a hub 82, see Fig. 7, which is fixed to gear 47 and cam 38 by bolts like 83. Gear 47 and its attachments just described are rotatably carried by the shaft 64, whereby gear 47 and its attachments can operate at constant speed, being driven by pinion 45 and gear 46, whereas shaft 64 and its wheel 22 is operated step by step by the Maltese cross 31 and pins 78 and 79. Gear 76 drives gear 75 and shaft 64 at twice the speed and double the angle of its own movement as the gear ratio is 2 to 1. The cross 31 is driven a quarter of a turn by each of the pins 78 and 79, and hence gear 75 and shaft 64 are driven one-half revolution for each quarter turn of the cross 31.

As shown in Fig. 8, each fruit holder 35, 36 is provided with a series of prongs like 84 to impale and hold each fruit half in its holder after the fruit has been cut in half by the blade 21. It was previously described that the fruit holders 35, 36 which are constantly rotating, grasped the fruit in the bucket 34 when the bucket is in the position shown in Fig. 2, the fruit holders being brought into an engagement with opposite sides of the fruit under control of the inclined portion 44 of the cam groove as shown in Fig. 11. The fruit holders 35, 36 are left in their fruit grasping position by the straight portion 85 of the cam groove, while the fruit is cut in half by blade 21. Thereafter the inclined groove portion 86 operates on the index roller 42 to separate the fruit holders and they are maintained separated by the straight groove portion 87 to permit the reamer 39 to be brought into a position 180 degrees from that shown in Fig. 2. The inclined cam groove 88 then causes the fruit holders to be brought together to urge the fruit halves against the reamer 39, the fruit holders rotating at this time and being maintained in reaming position by the straight groove portion 89. Then the fruit holders are separated by the inclined portion 90 and the ejector 41 contacts the rotating hulls to push them out of their holders. The hulls drop on a screen 91 and into a suitable container 92 in the base of the machine, while the juice extracted passes through the screen 91 and chute 105 into a container 93. The fruit holders 35, 36 are moved to their separated position by the inclined groove 90 and are maintained separated by straight groove 43 during the time that the dipper 14 deposits a fresh orange in the bucket 34 and until the dipper has been tilted up and the bucket 34 has advanced to the position shown in Fig. 2, whereupon the cycle of operations is repeated until interrupted by the happening of certain events which will be described later.

In the cycle of operation, the disc wheel 22 is at rest with the receiving cup 34 in line with the fruit holding cups 35, 36 only long enough for them to be extended and grasp the fruit. The disc wheel 22 then revolves to pass the knife 21 through the fruit before the cups 35, 36 begin to retract. When the disc wheel 22 has made a half revolution, the cups 35, 36 are again extended (more slowly than the first time) forcing the fruit on to the reamer 39. The cups 35, 36 dwell in the extended position long enough to complete the reaming operation and again retract before the disc 22 starts to turn again. This latter operation takes a longer time than the first. As the driving gear 47 and the Geneva motion driving pins 78, 79 revolve at a constant speed, the unequal timing is accomplished by unequal spacing of the pins 78, 79.

Referring to the development of cam in Fig. 11, from the start position, the first rise 44 of the cam 38 extends the cups 35, 36 to grasp the fruit. This rise is the highest as the fruit is on the center line of the disc 22. The next drop 86 carries the two cut halves back far enough for the reamer 39 to pass between them, so this path 87 is the lowest. The second rise 88 presses the fruit halves on the reamer 39. The reamer 39 is purposely made high and the rise 89 is lower than before so that there will be some space between the edge of the rind and disc 22, this space allowing the juice to run down. The next drop 90 in the cam is just enough to allow the reamer 39 to pass the empty shell but have the extractor 41 following, catch the edge of the fruit shells and strip them out of the cups 35, 36.

The outside radius of disc 22 has been cut down ⅝" for about 30 degrees back of the knife edge 21 as indicated at 111. This is sufficient to clear the roller 24 on the dipper 14 in its lowest position. The dipper 14 is raised by the end 112 of this cut-away portion.

The spring 113, see Fig. 1, on the lever system 58 to 63 is to take up lost motion and keep the roller 42 against the left side of cam 38.

As shown in Figs. 1 and 2, the juice container 93 has a suitable handle 94 so that it can be withdrawn from the machine when it is to be emptied of juice expressed by the machine. The top of container 93 has a flange 95 which re-movably rests on a pair of arms 96, 97 secured at their inner ends to a rock shaft 98. Also, secured to the shaft 98 is a downwardly extending arm 99, the movement of which is limited by suitable stops 120, 121. The lower end of arm 99 actuates a switch 100 when the container 93 is loaded with juice. The supporting arms 96, 97 are maintained in a raised position by a spring 101 connected at one end to the frame 9 as indicated at 102, and connected at its other end to an adjusting bolt 103 secured to the operating arm 99.

After container 93 is removed, spring 101 urges the arms 96 and 97 upwardly until arm 99 strikes stop 120. The inner ends of the arms 96 and 97 slope downwardly as indicated at 106 in Fig. 2 so as to facilitate guiding the flange 95 on to the arms 96 and 97 when the container 93 is replaced in the machine.

Referring to Fig. 12, the motor 13 is connected through the various circuits shown to a plug 107 to be connected to a suitable source of D. C. or A. C. current. The stop switch 108 is in series in the line; it is normally closed, and when operated will of course stop the motor 13. The push button switch 109 is a start switch and when operated it energizes relay 124 which completes the circuit to the motor through its contacts 125. When switch 109 is released relay 124 remains energized with its terminal 113 under control of switches 30, 12, 100. The dipper switch 30, as shown is in parallel with a branch 119 wherein the feed chute switch 12 and the container switch 100 are connected in series. If the feed chute is empty, with switch 12 open, and/or if container switch 100 is open due to the container being loaded with juice, the motor 13 will not stop until the dipper switch 30 also is open which occurs when the wheel 22 is empty of cut fruit, the roller 24 having dropped off of the point 33, shown in Fig. 2. If the feed dipper 14 has a fruit in it at the time the container 93 is filled, the dipper 14 with its fruit will dip into the opening 32, but the machine will be stopped by switch 30 before the fruit is cut in half by the blade 21, the preceding fruit having had the juice squeezed from it and the rinds ejected by the ejector 41. Hence, the stopping of the motor 13 is initiated either by the container 93 being loaded, to open switch 100, or by feed chute 4 being empty to open switch 12, the stopping of the motor being completed when the dipper switch 30 operates with the wheel 22 in position with no uncut fruit in it.

Various modifications may be made in the invention without departing from the spirit of the following claims.

I claim:

1. A fruit juice extractor comprising a base, a fruit holder having companion parts, means supporting said parts for reciprocating movement on a path fixed with respect to said base, means for rotating said parts during reciprocating movement thereof on said path, means for reciprocating said parts, with a fruit conveyor, a cutting blade and a squeeze head mounted on a common carrier for movement of said fruit conveyor, said cutting blade and said squeeze head across said path.

2. In combination, a cutting machine comprising a wheel having an opening having a cutting blade on the lagging side thereof, a bucket on the leading side thereof, means for depositing in said bucket an article to be cut by said blade, rotatable holders for said article, and means for advancing said holders to grasp the article and hold it while said bucket is leaving the same and while said blade is advancing into cutting relation with the article thus held.

3. In combination, a cutting machine according to claim 2 wherein said depositing means comprises a dipper having a cam follower actuated by said wheel.

4. A fruit juice extractor comprising a wheel having a bucket, a cutting blade, a squeeze head, and an ejector thereon, means for delivering a fruit to said wheel once each revolution thereof, cooperating reciprocating half fruit holders, a motor and driving connections for rotating said wheel step by step, means for operating said holders to remove the fruit from said bucket and present the fruit to said blade and squeeze head in timed relation, thereafter said ejector being operative to eject the rind preparatory for another cycle of operation, means for rotating said holders, means for reciprocating said holders in timed relation with rotation of said wheel and during rotation of said holders, and means for insuring that said wheel will stop in position to receive another fruit and with the previous fruit squeezed and ejected, said means comprising means for initiating the stopping of said motor when said delivering means is empty of fruit, and means operating in timed relation with said wheel for completing the stopping of said motor after a squeezed fruit is ejected and before the next whole fruit is delivered.

5. In combination, a conveyor having a wheel having a bucket for a single article to be cut, a knife on said wheel at the lagging side of said bucket, said bucket having open ends, companion article holders, means for moving said holders through opposite ends of said bucket to grasp the article in the bucket, and means for moving the bucket away from the article thus held to thereby bring said knife into cutting relation with the article thus held in said holders.

6. A fruit handling apparatus comprising a base, companion half fruit holders each shallower than a half fruit, means for rotating said holders, means supporting said holders for reciprocation and for rotation on an axis fixed with respect to said base, a squeeze head movable to and from a position between said holders, and a rind removing abutment for engaging the rim portion of the fruit halves projecting beyond their said holders, said abutment being movable adjacent said holders while said rotating means is operating for ejecting the rinds therefrom.

7. A fruit juice extractor comprising a movable support having thereon a fruit container, means for cutting said fruit, means for squeezing said fruit and means for ejecting the rind of said fruit, means for delivering a fruit to said container once during each cycle of operation thereof, cooperating reciprocating half fruit holders adapted to advance and grasp the fruit in said container and while said container is moving away and while said cutter is advancing, said holders being movable apart thereafter to admit said squeeze head between the fruit halves and after operation thereof holding the rind in the path of said ejector, a motor for operating said support step by step with said support stationary during operation of said fruit holders to grasp the fruit and also stationary while said fruit holders are advancing the fruit halves onto said squeeze head, and means for insuring that said support will stop in position for said container to receive another fruit when the previous fruit is squeezed and ejected, said last mentioned means comprising means for initiating the stopping of said motor when said delivering means is empty of fruit, and means operating in timed relation with said support for completing the stopping of said motor after a squeezed fruit is ejected and before the next whole fruit is delivered to said container.

8. A fruit juice extractor according to claim 7 wherein said support comprises a rotatable wheel.

9. A fruit juice extractor comprising companion half fruit holders, means supporting said holders for spreading apart and squeezing movements, a wheel, a knife and a squeeze head mounted on said wheel, means for operating said wheel to move said knife into position across the space between said holders at certain times and for moving said squeeze head into position between said holders and for arresting movement of said squeeze head at other times during squeezing operation of said fruit holders, and means for rotating said holders during cutting operation of said knife and during squeezing movement of said holders toward said squeeze head.

10. In combination, a conveyor having a wheel having a bucket for a single article to be cut, a knife on said wheel at the lagging side of said bucket, said bucket having open ends, companion article holders, means for moving said holders through opposite ends of said bucket to grasp the article in the bucket, means for rotating said wheel to move the bucket away from the article thus held to thereby bring said knife into cutting relation with the article thus held in said holders, and means for rotating said holders during cutting movement of said knife.

CHESTER M. WOODRUFF.

REFERENCES CITED

The following references are of record in the file of this patent:

UNITED STATES PATENTS

| Number | Name | Date |
|---|---|---|
| 1,289,563 | Simon | Dec. 31, 1918 |
| 1,361,121 | Weiss | Dec. 7, 1920 |
| 1,834,097 | Gum | Dec. 1, 1931 |
| 1,957,883 | Grayson | May 8, 1934 |
| 2,067,555 | Walker | Jan. 12, 1937 |
| 2,313,318 | Brown | Mar. 9, 1943 |
| 2,336,676 | Erickson | Dec. 14, 1943 |
| 2,338,148 | Walker | Jan. 4, 1944 |
| 2,365,832 | Monroe | Dec. 26, 1944 |
| 2,404,990 | Silva | July 30, 1946 |